United States Patent [19]

Balser

[11] 4,206,639
[45] Jun. 10, 1980

[54] DOPPLER ACOUSTIC WIND SENSOR
[75] Inventor: Martin Balser, Encino, Calif.
[73] Assignee: Xonics, Inc., Van Nuys, Calif.
[21] Appl. No.: 854,782
[22] Filed: Nov. 25, 1977
[51] Int. Cl.² ............................................. G01W 1/02
[52] U.S. Cl. ................................... 73/189; 73/194 A; 367/90
[58] Field of Search ................. 73/194 A, 170 R, 189; 340/1 R; 343/5 W, 9

[56] References Cited
U.S. PATENT DOCUMENTS

| 3,341,807 | 9/1967 | Lobdell | 340/1 R |
| 3,675,191 | 7/1972 | McAllister | 73/170 X |
| 3,735,333 | 5/1973 | Balser et al. | 340/1 R |
| 3,889,533 | 6/1975 | Balser | 73/189 |

Primary Examiner—Charles A. Ruehl
Attorney, Agent, or Firm—Harris, Kern, Wallen & Tinsley

[57] ABSTRACT

A system for remote measurement of wind velocity and direction. An acoustic echo transmitter for directing a beam of acoustic energy toward a zone, and a plurality of receivers for receiving acoustic energy scattered by wind in the zone, with each receiver output having a doppler frequency component. A system which permits positioning the receivers at various elevations and various distances and angles from the transmitter, and a system particularly sensitive to measurement of vertical wind velocity.

7 Claims, 6 Drawing Figures

DOPPLER ACOUSTIC WIND SENSOR

BACKGROUND OF THE INVENTION

This invention relates to a new and improved system for the remote measurement of wind velocity and direction. The new system is particularly suited for making accurate measurements of vertical wind velocity, and for positioning in various locations, the positioning of the various components being highly flexible.

Doppler-acoustic radar has been shown to provide a means for measuring the wind velocity from a remote location. Briefly stated, the measurement is based upon the scattering of acoustic waves by natural fluctuations in the atmosphere. The motion of the air at the scattering point, i.e., the wind, imposes a change in the frequency of the acoustic wave, known as the doppler shift. Coherent processing of the received signal yields a measurement of the doppler shift, from which one component of the wind (determined by the geometrical configuration of the transmitter and receiver) can be calculated. The vector wind can be determined by utilizing different transmission paths to measure independent components.

A configuration that satisfies the requirement for full wind vector determination is shown in U.S. Pat. No. 3,889,533, and the disclosure of that patent is incorporated herein by reference. Specifically, a transmitter antenna produces a vertically-directed beam of acoustic waves. Three receiver antennas are placed on a circle, centered at the transmitter antenna, uniformly spaced at 120° separations. This symmetric configuration yields relatively simple equations for the three wind components u, v and w (respectively directed eastward, northward and upward), and has the additional advantage that the time of arrival of a pulse scattered from a given altitude is the same at all three receivers.

The symmetric configuration described in the patent and its associated signal processing suffer however from two significant shortcomings. One is that the vertical component of the wind occupies a special position of sensitivity compared with the two horizontal components. At low altitudes and also at higher altitudes when averaged over minutes or more, the vertical component of the wind tends to be much smaller than commonly encountered horizontal winds. A given error in measuring the vertical component tends therefore to be relatively more serious. Further, the component of wind that is measured by a receiver antenna displaced from the transmitter antenna is in the direction of the bisector of the angle formed at the scattering point by the rays of the two antennas. This component can be seen to be typically around 20° (or even less) from the vertical for the higher measurement altitudes. The measured component thus weights the vertical components more strongly than it does the horizontal component, and any error in the vertical component is magnified in computing the horizontal components. In both respects then, an accurate measurement of the vertical wind component is desirable.

The second shortcoming of the perfectly symmetric configuration is that it limits the flexibility in siting the installation. Looked at the other way, a user may be unable to or not want to deploy the antennas in a symmetric manner because of terrain variations, structures and other obstructions, or for other reasons of necessity or convenience.

Accordingly, it is an object of the present invention to provide a new and improved wind velocity measuring system which produces a more accurate measurement of the vertical component of wind velocity. A further object is to provide a new and improved wind velocity measuring system in which the antenna configuration is not a limiting factor, permitting placing of receivers at various elevations, distances and angles with respect to the transmitter. An additional object is to provide new and improved signal processing with timing control for the signals from the various receivers.

These and other objects, advantages, features and results will more fully appear in the course of the following description.

SUMMARY OF THE INVENTION

The wind velocity measuring system includes an acoustic echo system transmitter for directing a beam of acoustic energy toward a zone and a plurality of receivers for the transmitter and spaced from each other and the transmitter, with each receiver directed toward the zone for receiving acoustic energy of the transmitter scattered by wind in the zone and providing a receiver output signal having a doppler frequency component. This system further includes a signal processor having the receiver output signals as inputs for generating processor output signals varying as a function of the velocity of the wind in the zone along defined coordinates. A vector velocity can also be produced if desired. The system further includes an additional receiver located at the transmitter and directed toward the zone along the transmitter beam, with this receiver providing the signal particularly sensitive to vertical wind velocity. The signal processor includes a separate channel for each receiver output signal with each channel having a sampling gate and a doppler shift detector, and a delay generator providing control signals to each sampling gate for introducing delays in each channel with each delay varying as a function of the position of the corresponding receiver with respect to the transmitter.

DESCRIPTION OF THE PREFERRED EMBODIMENTS

Figure 1:
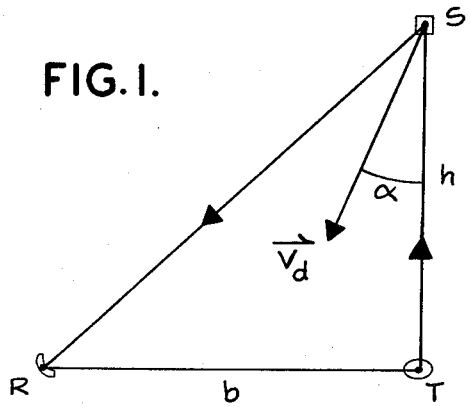
FIG. 1 is a diagram illustrating a single unit of a doppler acoustic radar with transmitter and receiver.

FIG. 1 shows a single unit of a doppler-acoustic radar that measures a single component of the wind. The transmitter T emits a pulse into a vertical beam of acoustic radiation. The scattering volume S scatters a fraction of the incident energy, some of this energy being received at the receiver R. The measured wind component for this configuration is in the direction, shown as the vector $\bar{v}_d$ in FIG. 1, of the bisector of the angle RST, which makes an angle $\alpha$ with the vertical.

The propagation delay required for the acoustic wave to travel up from T to S and thence to R is given by $$\tau = \frac{1}{c}(h + \sqrt{h^2 + b^2}) \qquad (1)$$

where b is the base leg, or distance between T and R, and c is the speed of sound.

Figure 2:
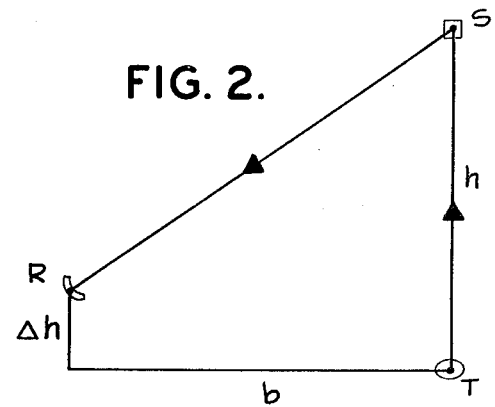
FIG. 2 is a diagram similar to that of FIG. 1 illustrating the transmitter and receiver at different elevations.

If the transmitter T and receiver R are at different altitudes, separated by $\Delta h$, as shown in FIG. 2, then the delay for the same scatterer at S is given by $$\tau = \frac{1}{c}(h + \sqrt{(h - \Delta h)^2 + b^2}) \qquad (2)$$

where h is taken to be the altitude in the vertical column relative to the transmitter T.

Figure 3:
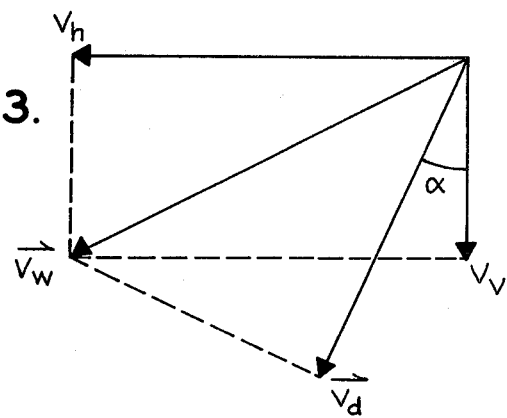
FIG. 3 is a diagram illustrating resolution of components from FIGS. 1 and 2.

The wind vector $\bar{v}_w$ in the plane of FIG. 1 or 2 can be resolved into its horizontal and vertical components, respectively $v_h$ and $v_v$, as shown in FIG. 3. Also shown in FIG. 3 is the doppler velocity $\bar{v}_d$, at an angle $\alpha$ to the vertical, that is measured by the acoustic radar unit depicted in FIG. 1 or 2. It is readily seen that $$i\ v_d = v_h \sin \alpha + v_v \cos \alpha \qquad (3)$$

In the case that the receiver antenna is colocated with the transmitter antenna $b=0$ and $\alpha=0$. Equations 1 and 3 reduce in this instance to $$\tau = 2h/c \qquad (4)$$

and $$v_d = v_v \qquad (5)$$

Equations 4 and 5 represent the conditions for the delay of a monostatic radar return and show that this receiver directly senses the vertical component of the wind (and only that component).

Figure 4:
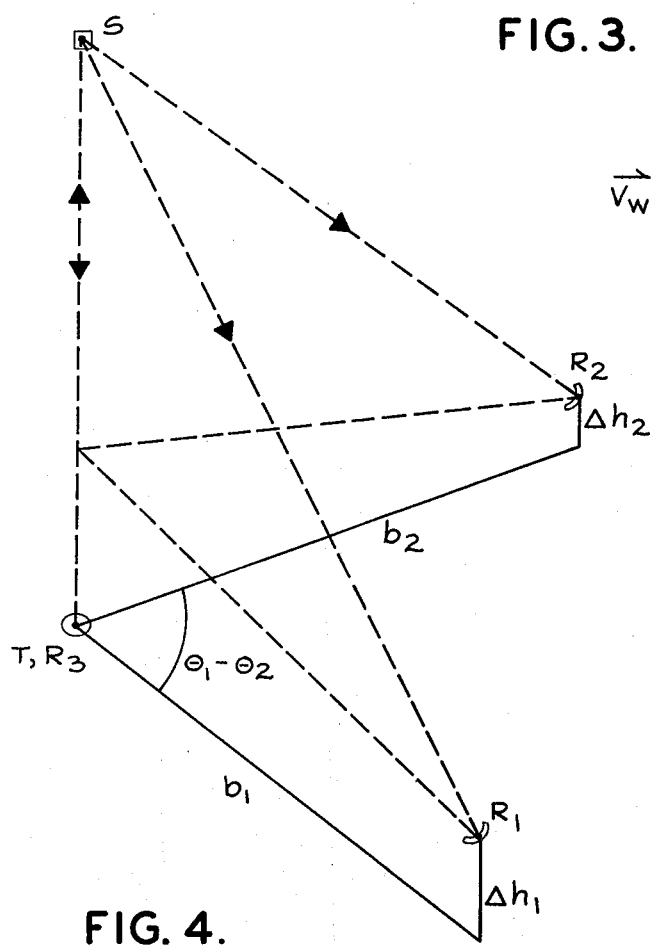
FIG. 4 is a diagram illustrating the presently preferred embodiment of the invention with transmitter and three receivers.

The configuration for the preferred embodiment of the invention is shown in FIG. 4. Two receivers $R_1$, $R_2$ are displaced from the transmitter T by horizontal distances $b_1$ and $b_2$ and vertically by $\Delta h_1$ and $\Delta h_2$. A third receiver $R_3$ is placed at the location of the transmitter. The antenna for the receiver $R_3$ may be physically incorporated into the antenna of the transmitter T, or it may be a separate antenna in the immediate vicinity.

The returned signal from the volume or zone S at a given altitude h arrives at the three receivers $R_1$, $R_2$, $R_3$ at times $\tau_1$, $\tau_2$, $\tau_3$, respectively $$\tau_1 = \frac{1}{c}(h + \sqrt{(h - \Delta h_1)^2 + b_1^2}) \qquad (6)$$

$$\tau_2 = \frac{1}{c}(h + \sqrt{(h - \Delta h_2)^2 + b_2^2})$$

$$\tau_3 = 2h/c$$

Note that $\Delta h$ may be positive or negative, depending on whether the receiver in question is at a higher or lower altitude than the transmitter antenna; the delay $\tau$ is affected accordingly.

The received signals are sampled for an interval around the delays given in equation 6, and the doppler velocity components $v_d$ are obtained in a conventional manner from the measured doppler shifts. The three doppler components $v_{d1}$, $v_{d2}$ and $v_{d3}$ can now be transformed to three other components $v_{h1}$, $v_{h2}$ and $v_v$, where $v_{h1}$ and $v_{h2}$ are the horizontal components of the wind parallel to the base legs to receivers $R_1$ and $R_2$ (see FIG. 3) and $v_v = v_{d3}$ is the vertical component of the wind (positive values point downward). In all cases a positive component points in the direction of the associated receiver antenna. From equation 3, it is easily seen that $$v_{h1} = \frac{1}{\sin \alpha_1}(v_{d1} - v_{d3} \cos \alpha_1) \qquad (7)$$

$$v_{h2} = \frac{1}{\sin \alpha_2}(v_{d2} - v_{d3} \cos \alpha_2)$$

$$v_v = v_{d3}$$

It is recognized explicitly in equations 7 that the angle $\alpha$ may be different for the two outlying antennas $R_1$, $R_2$ because of their differing values of $\Delta h$ and b.

Finally, it remains only to transform the two components $v_{h1}$ and $v_{h2}$ to the orthogonal wind components $v_x$ and $v_y$ in the desired directions. Generally, the coordinate system would be chosen so that the x-axis points eastward, the y-axis northward and the z-axis upward.

Figure 5:
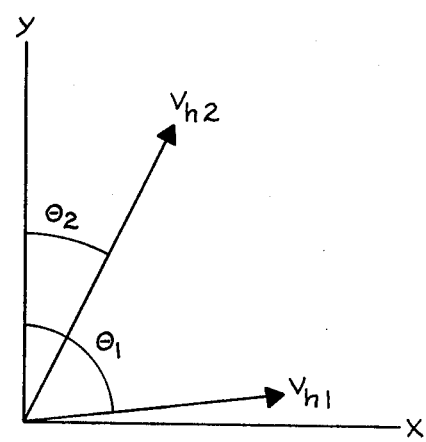
FIG. 5 is a diagram illustrating angular relationships for the system of FIG. 4.

The geometry is shown in FIG. 5, where $\theta_1$ and $\theta_2$ are the angles of the two horizontal components $v_{h1}$ and $v_{h2}$ measured clockwise from the y-axis (north). It is seen that $$v_x = \frac{1}{\sin(\theta_1 - \theta_2)}(v_{h1} \cos \theta_2 - v_2 \cos \theta_1) \qquad (8)$$

$$v_y = \frac{-1}{\sin(\theta_1 - \theta_2)}(v_{h1} \sin \theta_2 - v_{h2} \sin \theta_1)$$

$$v_z = v_v$$

It is a straightforward matter to convert the two rectangular horizontal components to speed and direction. Note that if the system is set up with receivers to the east and north of the transmitter, then $\theta_1 = 90°$, $\theta_2 = 0°$, and as expected $v_x = v_{h1}$ and $v_y = v_{h2}$.

Figure 6:
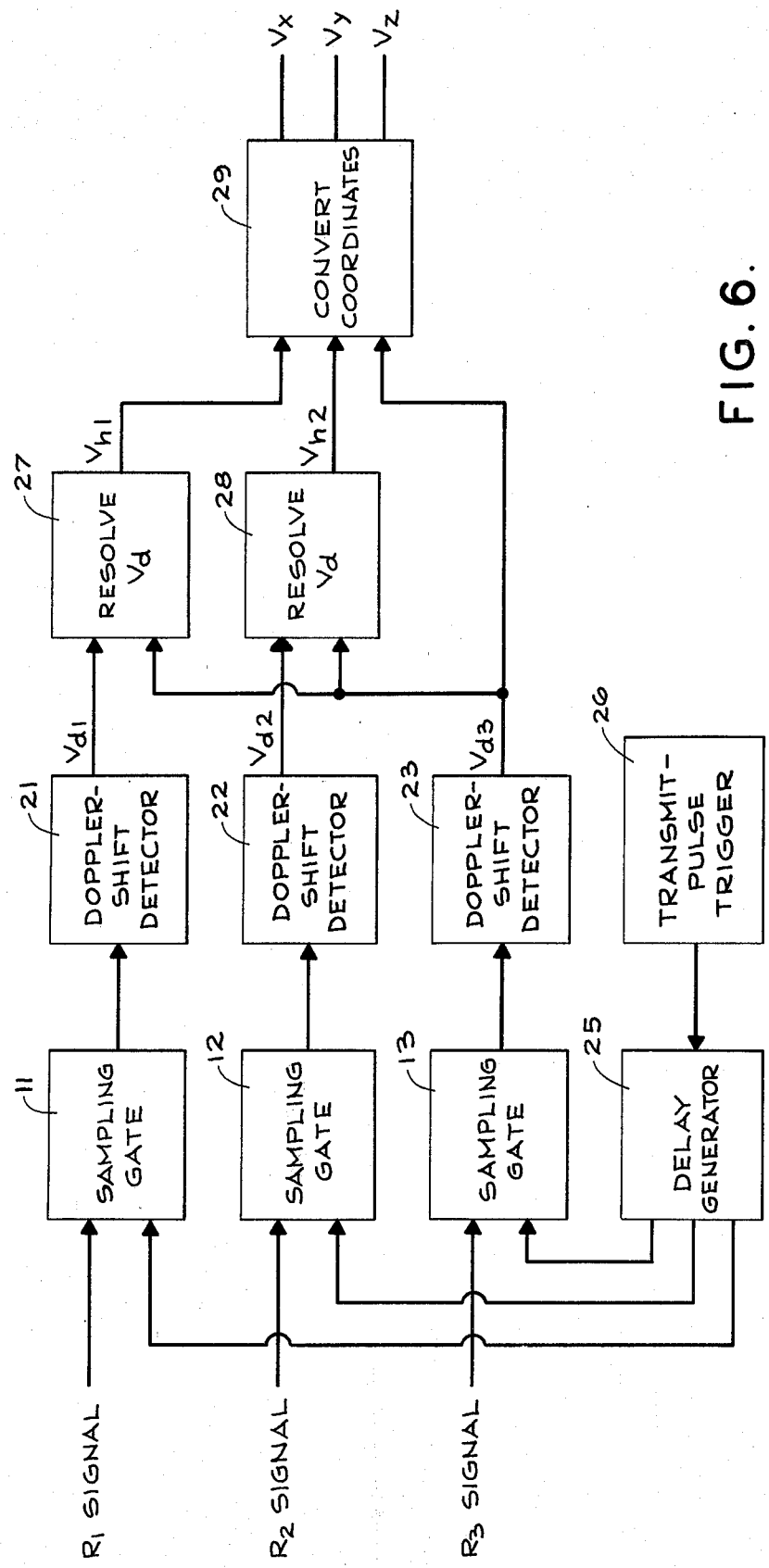
FIG. 6 is a block diagram of a signal processor for the system of FIG. 4.

All of this processing may be performed in the signal processor shown in FIG. 6. There is a separate channel for each receiver signal, with sampling gates 11, 12, 13 and doppler shift detectors 21, 22, 23 for signals from receivers $R_1$, $R_2$, $R_3$, respectively. A sampling gate extracts a segment of data from a receiver signal corresponding to the desired altitude at the time delays determined according to equation 6. This can be done for several different altitudes on each pulse and the subsequent processing carried out for each set of samples to yield a wind profile.

The gates 11, 12, 13 are controlled by pulses from a delay generator 25, with the initial timing pulse provided by the transmitter from a trigger circuit 26.

A set of doppler velocities $v_{d1}$, $v_{d2}$, $v_{d3}$ is then determined from the doppler frequency detected in the sampled signals. These are then transformed to the horizontal components $v_{h1}$ and $v_{h2}$ according to equation 7 in resolvers 28, 28, and finally to the three orthogonal components $v_x$, $v_y$ and $v_z$ according to equation 8 in a converter 29. A vector may be computed from the three components if desired.

This same processing chain can also be carried out for a 2-receiver system in which receiver $R_3$ is not included. For this case, the vertical wind component is neglected, i.e., $v_{d3}=0$. The flexibility of placement of the two outlying receiver antennas is retained.

In a wind velocity measuring system according to the invention that has been built and operated (both as a 2-receiver system and a 3-receiver system), the timing signals to the sampling gates were supplied by a digital computer. All of the data processing was accomplished in the same computer on the digitized output of the sampling gates. This same process can however be carried out by analog devices, either variable to duplicate the flexibility of a computer in which the parameters in the program can be easily modified or hard-wired once the system configuration is defined. In addition, replication of the hardware chains as shown diagramatically in FIG. 6 can be avoided in large part by rapidly commutating among the channels. Thus, for example, in the system as built and operated, all three signals are presented to a single channel which runs at a sample rate three times higher than required for one channel while a commutator appropriately cycles through the input signals and distributes the output samples. Therefore, when separate channels are referred to in the specification, drawings and/or claims, it is understood that both physically separate channels and one channel sequentially used for separate signals are included.

Thus it is seen that the new wind velocity measuring system is sensitive to the vertical component of wind and can provide an output coordinate reading directly in vertical velocity. Also, the system has high flexibility in siting of transmitter and receiver antennas, permitting the antennas to be located as the terrain or other conditions dictate rather than with planar, equiangular and equidistant positioning. Also, the wind velocity measurement results can be produced in rectangular coordinates or a vector or otherwise as desired.

I claim:

1. In a system for measuring the wind velocity at a specific location, the combination of:

an acoustic echo system transmitter for directing a beam of acoustic energy toward a zone spaced from said transmitter;

a plurality of first receivers for said transmitter and spaced from each other and from said transmitter, with each receiver directed toward said zone for receiving acoustic energy of said transmitter scattered by wind in said zone and providing a receiver output signal having a doppler frequency component;

an additional receiver for said transmitter and located at said transmitter and directed towards said zone along the transmitter beam for receiving acoustic energy of said transmitter scattered by wind in said zone and providing a receiver output signal having a doppler frequency component; and signal processor means having the receiver output signals as inputs for generating processor output signals each varying as a function of the velocity of the wind in said zone along one of three defined coordinates, said signal processor means including a separate channel for each receiver output signal, with each channel including a sampling gate and doppler shift detector, and a delay generator providing control signals to each of said sampling gates for introducing delays in each channel with each delay varying as a function of the position of each corresponding receiver with respect to the transmitter.

2. A system as defined in claim 1 wherein said receivers are positioned at different vertical elevations.

3. A system as defined in claim 1 wherein said first receivers are positioned at different vertical elevations and at different horizontal distances from said transmitter.

4. A system as defined in claim 1 wherein said transmitter beam is vertical and one of said processor output signals is a measure of the vertical velocity of the wind in said zone.

5. In a system for measuring the wind velocity at a specific location, the combination of:

an acoustic echo system transmitter for directing a beam of acoustic energy toward a zone spaced from said transmitter;

a plurality of receivers for said transmitter and spaced from each other and from said transmitter, with each receiver directed toward said zone for receiving acoustic energy of said transmitter scattered by wind in said zone and providing a receiver output signal having a doppler frequency component; and signal processor means having the receiver output signals as inputs for generating processor output signals varying as functions of the velocity of the wind in said zone, said processor including a separate channel for each receiver output signal, with each channel including a sampling gate and a doppler shift detector, and a delay generator providing control signals to each of said sampling gates for introducing delays in each channel with each channel delay varying as a function of the position of each corresponding receiver with respect to the transmitter.

6. A system as defined in claim 5 wherein said receivers are positioned at different vertical elevations.

7. A system as defined in claim 6 wherein said receivers are positioned at different vertical elevations and at different horizontal distances from said transmitter.

* * * * *

UNITED STATES PATENT AND TRADEMARK OFFICE
CERTIFICATE OF CORRECTION

PATENT NO. : 4,206,639
DATED : June 10, 1980
INVENTOR(S) : Martin Balser

It is certified that error appears in the above-identified patent and that said Letters Patent are hereby corrected as shown below:

Column 3, Equation 3, change "i $v_d = v_h \sin \alpha + v_v \cos \alpha$"

to -- $v_d = v_h \sin \alpha + v_v \cos \alpha$ --

Column 4, Equation 8, change "$v_x = \frac{1}{\sin(\theta_1 - \theta_2)} (v_{h1} \cos \theta_2 - v_2 \cos \theta_1)$"

to -- $v_x = \frac{1}{\sin(\theta_1 - \theta_2)} (v_{h1} \cos \theta_2 - v_{h2} \cos \theta_1)$ -- and change "$v_z = v_v$"

to -- $v_z = -v_v$ --

Signed and Sealed this

Fourth Day of November 1980

[SEAL]

Attest:

SIDNEY A. DIAMOND

Attesting Officer

Commissioner of Patents and Trademarks